United States Patent
Shirahatti et al.

(10) Patent No.: US 12,498,492 B2
(45) Date of Patent: Dec. 16, 2025

(54) SYSTEMS AND METHODS FOR POWER EFFICIENT SATELLITE TRACKING STRATEGY

(71) Applicant: Apple Inc., Cupertino, CA (US)

(72) Inventors: Harsha Shirahatti, Santa Clara, CA (US); Chaochao Wang, Placentia, CA (US)

(73) Assignee: Apple Inc., Cupertino, CA (US)

(*) Notice: Subject to any disclaimer, the term of this patent is extended or adjusted under 35 U.S.C. 154(b) by 271 days.

(21) Appl. No.: 18/137,700

(22) Filed: Apr. 21, 2023

(65) Prior Publication Data

US 2024/0353573 A1 Oct. 24, 2024

(51) Int. Cl.
*G01S 19/24* (2010.01)
*G01S 19/21* (2010.01)

(52) U.S. Cl.
CPC .............. *G01S 19/24* (2013.01); *G01S 19/21* (2013.01)

(58) Field of Classification Search
CPC .......... G01S 19/24; G01S 19/21; G01S 5/011; G01S 19/28; G01S 19/32; G01S 19/34
See application file for complete search history.

(56) References Cited

U.S. PATENT DOCUMENTS

| | | | |
|---|---|---|---|
| 9,903,955 B2* | 2/2018 | Elfstrom | G01S 19/24 |
| 2008/0117101 A1* | 5/2008 | Pan | G01S 19/40 342/357.29 |
| 2012/0007776 A1* | 1/2012 | Ariel | G01S 19/11 342/357.48 |
| 2015/0097731 A1* | 4/2015 | Russell | G01S 5/012 342/450 |
| 2017/0280283 A1* | 9/2017 | Venkatraman | H04W 4/021 |

FOREIGN PATENT DOCUMENTS

CA   2314960 C   11/2009

* cited by examiner

*Primary Examiner* — Ankur Jain
(74) *Attorney, Agent, or Firm* — FLETCHER YODER PC (57) ABSTRACT

An efficient satellite vehicle (SV) tracking mode that, when utilized by user equipment (UE), consumes less power and/or computing resources of the UE than a default SV tracking mode of tracking all visible SV, while maintaining consistent signal quality and/or positional, navigational, and/or timing information accuracy standards. Furthermore, use of the efficient SV tracking mode may be determined and implemented based on a signal environment associated with a location of the UE. In particular, the efficient SV tracking mode may be associated with a location based on a determination that signal quality thresholds are met during use of the efficient SV tracking mode at the location. Additionally or alternatively, the location may be associated with a geofenced area. The geofenced area may define a geographical area corresponding to implementation of the efficient SV tracking mode by a UE located within the geofenced area.

20 Claims, 6 Drawing Sheets

SYSTEMS AND METHODS FOR POWER EFFICIENT SATELLITE TRACKING STRATEGY

BACKGROUND

The present disclosure relates generally to determining global positioning of user equipment, and more specifically to power saving operations for tracking non-terrestrial vehicles and receiving positional, navigational, and/or timing information from a satellite-based radionavigation system.

Wireless communication devices (e.g., user equipment (UE)) may transmit and receive wireless navigational signals to and from a satellite-based radionavigation system (e.g., global navigation satellite system (GNSS), global positioning system (GPS)). In particular, UEs may track and establish wireless connections with multiple non-terrestrial vehicles, such as satellite vehicles (SVs), of the satellite-based radionavigation system and receive one or more navigational signals that include positional, navigational, and/or timing information indicative of the UEs determined geo-spatial position. In some instances, a UE may utilize a SV search and/or tracking strategy of tracking all available SVs (e.g., all visible SVs) to receive positional, navigational, and/or timing information that meets certain quality and/or accuracy standards. However, in some locations, the SV search strategy of tracking all available SVs may be an inefficient SV search strategy. For example, in certain locations, such as rural locations (e.g., benign, flat), an amount of signal interference (e.g., due to topographical characteristics, building size, building density) may be less when compared to a location with a higher amount of signal interference, such as urban locations. Thus, due to the lower amount of signal interference, a UE located in the rural locations may have an ability to meet the certain quality and/or accuracy thresholds while tracking a fewer number of SVs than a number of SVs tracked by the UE using the SV search and/or tracking strategy of tracking all available SVs. Therefore, use of the SV search strategy of tracking all available SVs by a UE at locations with lower signal interference may lead to increased consumption of power and/or computing resources by the UE than may be necessary to meet the certain quality and/or accuracy standards.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, one or more tangible, non-transitory, computer-readable media comprising instructions, that when executed by processing circuitry of a user equipment, cause the processing circuitry to receive, via a global navigation satellite system receiver of the user equipment, a route. In addition, the processing circuitry may receive, via an additional receiver of the user equipment, signal environment data associated with the route. The processing circuitry may operate the global navigation satellite system receiver using a first mode of operation based on the route starting in a geographic area associated with the first mode of operation, and operate the global navigation satellite system receiver using a second mode of operation based on the route not intersecting one or more geographic areas associated with the first mode of operation.

In another embodiment, an electronic device includes a global navigation satellite system receiver, and one or more processors coupled to the global navigation satellite system receiver. The one or more processors may be configured to receive first positional data of the electronic device via the global navigation satellite system receiver when operating using a first set of global navigation satellite system resources, receive first performance values associated with the first set of global navigation satellite system resources, receive second positional data of the electronic device via the global navigation satellite system receiver when operating using a second set of global navigation satellite system resources, the second set of global navigation satellite system resources being less than the first set of global navigation satellite system resources, and receive second performance values associated with the second set of global navigation satellite system resources. The one or more processor further configured to continue operating using the second set of global navigation satellite system resources based on the second performance values being within a threshold range of the first performance values, and switch to operating using the first set of global navigation satellite system resources based on the second performance values not being within the threshold range of the first performance values.

In yet another embodiment, a method performed by an electronic device, the method including receiving, at a processor of the electronic device, a first performance value associated with historical positional data of the electronic device when operating in a first operating mode in a geographical region. In addition, the method may include receiving, at the processor, a second performance value associated with current positional data of the electronic device when operating in a second operating mode in the geographical region, and operating, by the processor, the electronic device in the second operating mode based on the second performance value being with a threshold of the first performance value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to a non-terrestrial vehicles (e.g., satellite vehicle (SV)) search and/or tracking strategy of a UE that optimizes power and/or processing resources of the UE based on a determined signal environment associated with a location of the UE. More specifically, the SV search and/or tracking strategy may enable power saving operations for tracking the SVs, while maintaining certain signal quality and/or accuracy thresholds of received positional, navigational, and/or timing information from a satellite-based radionavigation system (e.g., GNSS, GPS). As discussed herein, a UE may transmit and receive wireless signals to and from the satellite-based radionavigation system (e.g., GNSS, GPS) that may include (e.g., be supported by) one or more non-terrestrial vehicles, such as satellite vehicles (SVs). In particular, UEs may track and establish wireless connections with multiple SVs to receive positional, navigational, and/or timing information indicative of the UEs actual geo-spatial position. In some embodiments, the UE may use a default SV search and/or tracking strategy that causes the UE to track all available SVs (e.g., all visible SVs) to receive positional, navigational, and/or timing information that meets certain signal quality and/or positional, navigational, and/or timing information accuracy standards.

However, in some signal environments (e.g., signal characteristics data associated with a location), the default SV search and/or tracking strategy of tracking all available SVs may be an inefficient SV search and/or tracking strategy. For example, in certain signal environments, such as rural signal environments (e.g., benign, flat), an amount of signal interference (e.g., due to topographical characteristics, building size, building density) may be less when compared to more urban signal environments that have a higher amount of signal interference (e.g., higher building density, higher building size). Furthermore, due to the lower amount of signal interference, a UE located in a rural signal environment may have an ability to meet the certain signal quality and/or positional, navigational, and/or timing information accuracy thresholds while tracking fewer number of SVs than a number of SVs tracked by a UE using the default SV search and/or tracking strategy. In other words, the UE located in the rural signal environment may be able to meet the certain signal quality and/or accuracy thresholds by tracking and connecting with fewer SVs. However, the default SV search and/or tracking strategy tracks all available SVs associated with a location of the UE, which, for certain signal environments, may cause the UE to track an amount of SVs that is greater than an amount of SVs that may be necessary to maintain the certain signal quality and/or accuracy thresholds. Therefore, use of the default SV search and/or tracking strategy, such as within some signal environments with lower signal interference, may lead to increased power and/or computing resources consumption of the UE than may be necessary to meet the certain signal quality and/or accuracy standards.

Therefore, embodiments herein provide for an efficient SV tracking mode (e.g., SV search and/or tracking strategy, reduction in satellites tracked, reduction in navigational resources) that, when utilized by a UE, consumes less power and/or computing resources of the UE than the default SV tracking mode (e.g., the default SV search and/or tracking strategies, tracking all available SVs, increase in satellites tracked, increase in navigational resources), while maintaining signal quality and/or positional, navigational, and/or timing information accuracy standards. For example, use of the efficient SV tracking mode may include one or more efficient tracking strategies that track a fewer number of satellites (e.g., reduce global navigational resources) than the one or more default tracking strategies of the default SV tracking mode. For example, the one or more efficient tracking strategies may include tracking only modernized signals versus a default strategy of tracking both modernized signals and non-modernized signals (e.g., legacy signals, C/A signals), tracking only medium and/or high elevation signals versus a default strategy of tracking all of low elevation, medium elevation, and high elevation signals (e.g., all available/visible high elevation, medium elevation, and low elevation signals), tracking only L1 and/or L5 signals, or any combination thereof.

Furthermore, use of the efficient SV tracking mode may be determined and implemented based on a signal environment (e.g., signal characteristics data associated with a location) of the UE. In particular, the efficient SV tracking mode may be associated with one or more locations based on a determination that one or more signal quality and/or positional, navigational, and/or timing information accuracy thresholds are met during use of the efficient SV tracking mode at the one or more locations. Additionally or alternatively, the one or more locations may be associated with a geofenced area. The geofenced area may define a geographical area corresponding to implementation of the efficient SV tracking mode by a UE located within the geofenced area. In addition, in some embodiments, the association of the one or more locations with the efficient SV tracking mode and/or the one or more geofenced areas may be determined based on historical context data indicative of the UE's successful use of the efficient SV tracking mode at the one or more locations over time. Moreover, the signal environment (e.g., signal environment data) and/or the geofenced areas may be updated based on the historical context data. In some embodiments, at least a portion of a navigational route of the UE may be associated with implementation of the efficient SV tracking mode based on the signal environment, the one or more geofenced areas, the historical context data, or any combination thereof.

Figure 1:
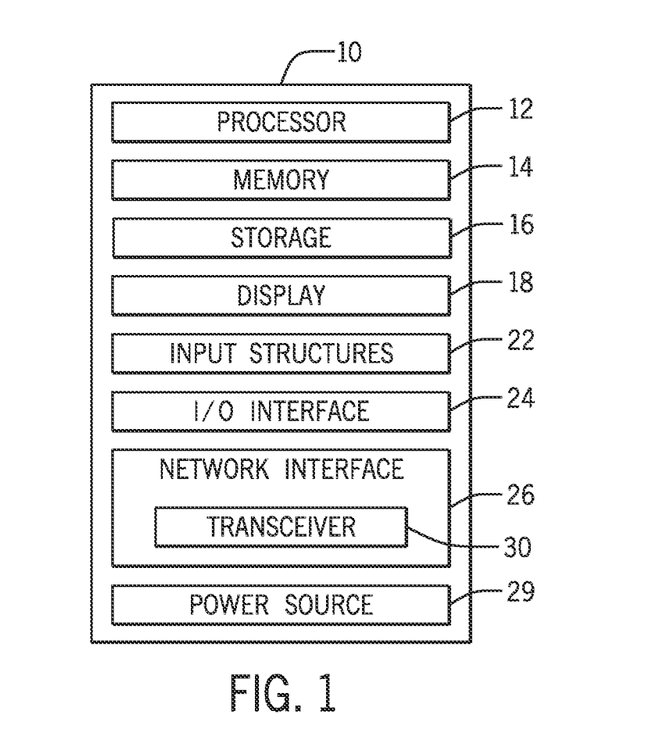
FIG. 1 is a block diagram of user equipment, according to embodiments of the present disclosure.

With the foregoing in mind, FIG. 1 is a block diagram of user equipment (UE) 10, according to embodiments of the present disclosure. The UE 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the UE 10.

By way of example, the UE 10 may include any suitable computing device, including a desktop or notebook computer, a portable electronic or handheld electronic device such as a wireless electronic device or smartphone, a tablet, a wearable electronic device, and other similar devices. In additional or alternative embodiments, the UE 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the UE 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the UE 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the UE 10 to provide various functionalities.

In certain embodiments, the display 18 may facilitate users to view images generated on the UE 10. In some embodiments, the display 18 may include a touch screen, which may facilitate user interaction with a user interface of the UE 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the UE 10 may enable a user to interact with the UE 10 (e.g., pressing a button to increase or decrease a volume level). The I/O interface 24 may enable UE 10 to interface with various other UE, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH® network, a radio access network (RAN), a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, Long Term Evolution® (LTE) cellular network, Long Term Evolution License Assisted Access (LTE-LAA) cellular network, 5th generation (5G) cellular network, and/or New Radio (NR) cellular network, a 6th generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the UE 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the UE 10 may include any suitable source of power, such as a rechargeable lithium polymer (Li-poly) battery and/or an alternating current (AC) power converter.

Figure 2:
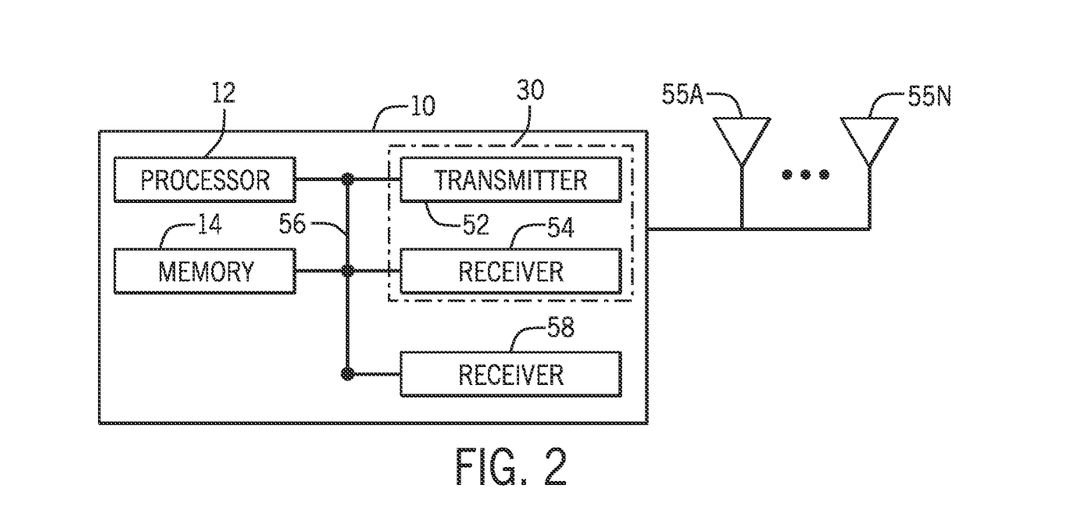
FIG. 2 is a functional diagram of the user equipment of FIG. 1, according to embodiments of the present disclosure.

FIG. 2 is a functional diagram of the UE 10 of FIG. 1, according to embodiments of the present disclosure. As illustrated, the processor 12, the memory 14, the transceiver 30, a transmitter 52, a receiver 54, antennas 55 (illustrated as 55A-55N, collectively referred to as an antenna 55), and/or navigation network receiver 58 (e.g., satellite-based radionavigation system network receiver 58, global navigation satellite system receiver 58) may be communicatively coupled directly or indirectly (e.g., through or via another component, a communication bus, a network) to one another to transmit and/or receive signals between one another.

The UE 10 may include the transmitter 52 and/or the receiver 54 that respectively enable transmission and reception of signals between the UE 10 and an external device via, for example, a network (e.g., including base stations or access points) or a direct connection. As illustrated, the transmitter 52 and the receiver 54 may be combined into the transceiver 30. The UE 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The UE 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

Additionally, the UE 10 may also include the navigation network receiver 58 that may enable the UE 10 to receive navigational signals (e.g., positional data) from a satellite-based radionavigation system network (e.g., GNSS network, GPS network). The satellite-based radionavigation system network may include one or more satellite vehicles (SVs) (e.g., GNSS satellites, GPS satellites) and/or one or more ground stations configured to transmit the navigational signals. In particular, the navigation network receiver 58 may be configured to operate in one or more operational modes (e.g., modes of operation), wherein each operational mode may specify a subset of the one or more satellite vehicles (e.g., set of global navigational satellite system resources) and/or a subset of the navigational signals that may be received via the navigation network receiver 58. In some embodiments, as discussed in more detail herein, the one or more modes of operation may include a default SV tracking mode and/or an efficient SV tracking mode. The navigational signals may include a satellite's observation data, broadcast orbit information of tracked satellites, and supporting data, such as meteorological parameters, collected from co-located instruments of a satellite. For example, GNSS navigational signals may be received from a Global Positions System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on.

As described above, the navigation network receiver 58 may receive navigational signals from one or more SVs and process the navigational signals to determine a global position (e.g., geo-spatial position) of the UE 10. In particular, each of the SVs associated with the satellite-based radionavigation system network may transmit one or more pilot channels alongside a data signal. Each pilot channel is a dataless signal transmitted from a respective SVs. The UE 10 may process each of the pilot channels received from one or more respective SVs to determine the position of the UE 10.

As illustrated, the various components of the UE 10 may be coupled together by a bus system 56. The bus system 56 may include a data bus, for example, as well as a power bus, a control signal bus, and a status signal bus, in addition to the data bus. The components of the UE 10 may be coupled together or accept or provide inputs to each other using some other mechanism.

Figure 3:
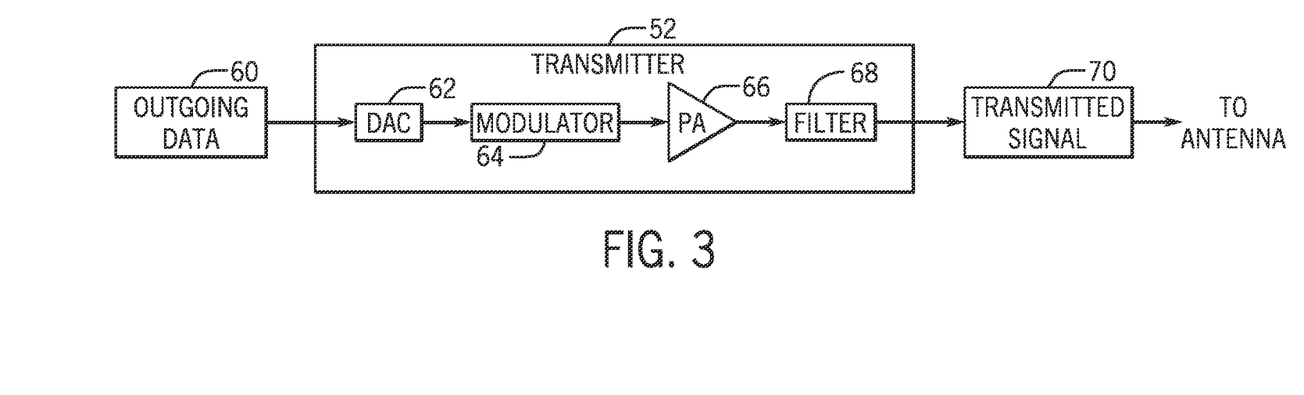
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the UE 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
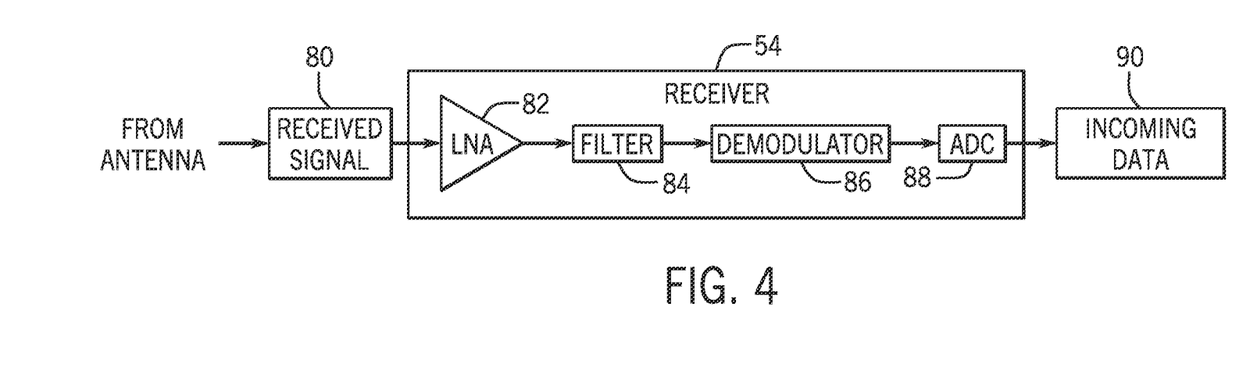
FIG. 4 is a schematic diagram of a receiver of the user equipment of FIG. 1, according to embodiments of the present disclosure.

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE, and more specifically, a receiver front end (RXFE) of the UE 10.

A demodulator 86 may remove a radio frequency carrier signal and/or extract a demodulated signal (e.g., an envelope signal) from the filtered signal for processing. An analog-to-digital converter (ADC) 88 may receive the demodulated analog signal and convert the signal to a digital signal of incoming data 90 to be further processed by the UE 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

Figure 5:
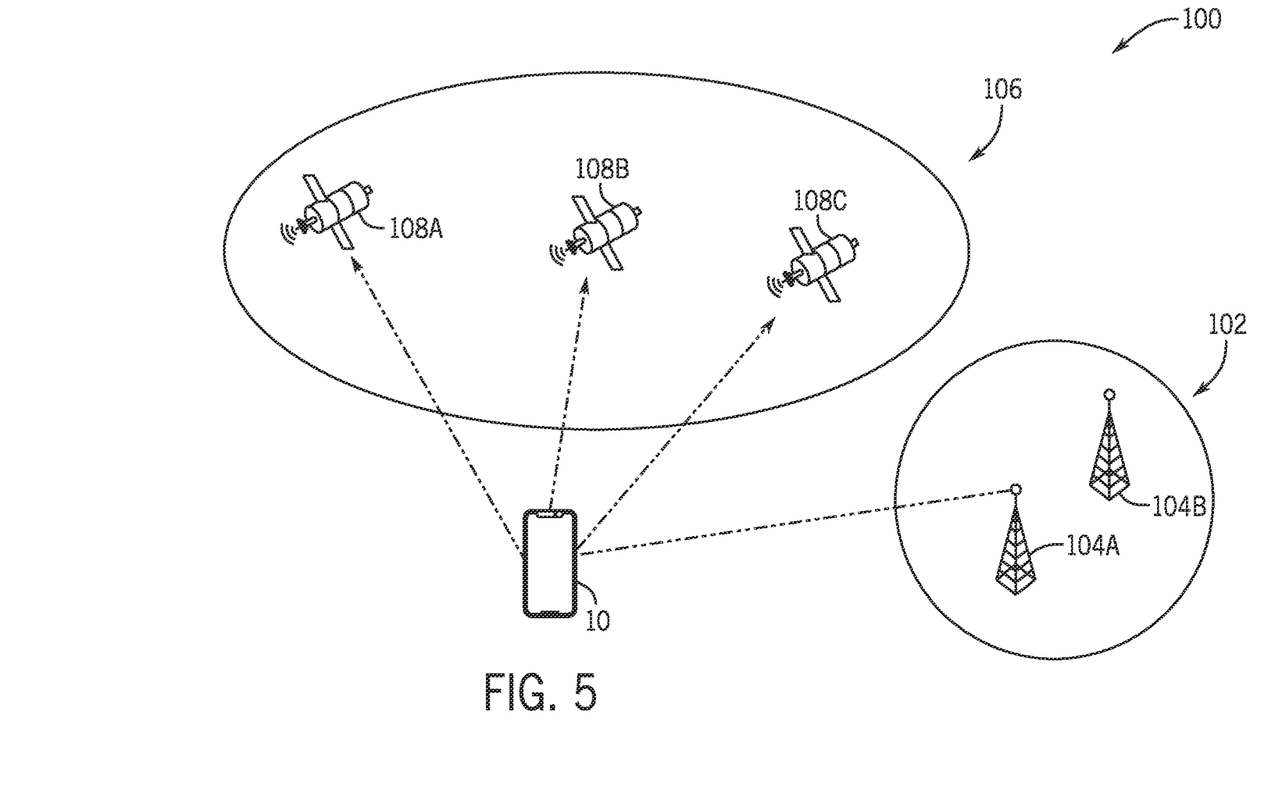
FIG. 5 a schematic diagram of a communication system including user equipment communicatively coupled to a wireless communication network supported by a base station, and communicatively coupled to a satellite-based radionavigation system network supported by one or more satellite vehicles, according to embodiments of the present disclosure.

FIG. 5 is a schematic diagram of a communication system 100 including UE 10 communicatively coupled to a wireless communication network 102 (e.g., a third generation (3G) cellular network, a fourth generation (4G) or Long Term Evolution (LTE) cellular network, a fifth generation (5G) or New Radio (NR) cellular network, a beyond 5G cellular network, or the like) supported by one or more base stations 104A, 104B (collectively 104), and communicatively coupled to a satellite-based radionavigation system network 106 supported by one or more satellite vehicles (SVs) 108A, 108B, 108C (collectively 108), accordingly to embodiments of the present disclosure. In particular, the base stations 104 may include Next Generation NodeB (gNodeB or gNB) base stations and may provide 5G/NR coverage via the wireless communication network 102 to the UE 10. The base stations 104 may include any suitable UE, such as a communication hub or node that facilitates, supports, and/or implements the network 102. In some embodiments, the base stations 104 may include Evolved NodeB (eNodeB) base stations and may provide 4G/LTE coverage via the wireless communication network 102 to the UE 10. Each of the base stations 104 may include at least some of the components of the UE 10 shown in FIGS. 1 and 2, including one or more processors 12, the memory 14, the storage 16, the transceiver 30, the transmitter 52, the receiver 54, and the associated circuitry shown in FIGS. 3 and 4. It should be understood that while the present disclosure may use 5G/NR as an example specification or standard, the embodiments disclosed herein may apply to other suitable specifications or standards (e.g., such as the 4G/LTE specification, a sub-4G specification, a beyond 5G specification, such as a 6G specification, and so on). Moreover, the network 102 may include any suitable number of base stations 104 (e.g., one or more base stations 104, four or more base stations 104, ten or more base stations 104, and so on).

Furthermore, the satellite-based radionavigation system network 106 (e.g., GNSS network, GPS network) may be implemented and/or supported by one or more SVs 108 (e.g., GNSS satellites, GPS satellites), ground stations, and so on, configured to transmit one or more navigational signals (e.g., positional data). As discussed herein, the UE 10 may implement satellite search and/or tracking strategies to communicatively couple to and/or track one or more of the SVs 108 (e.g., the satellite-based radionavigation system network 106 supported thereon). In addition, the UE 10 may receive navigational signals (e.g., positional data) from one or more of the tracked SVs 108 and process the navigational signals to determine a global position (e.g., geo-spatial position) of the UE 10. In certain embodiments, the UE 10 may additionally receive and/or determine signal quality data (e.g., one or more signal quality data values, one or more positional, navigational, and/or timing information accuracy values) associated with the received navigational signals from the tracked SVs 108. For example, the signal quality data may be determined (e.g., calculated) based on a received signal strength level (e.g., received GNSS signal strength level, TOP 4+N) of the navigational signals, a visibility index (e.g., a ratio of tracked satellites to total visible satellites, expected signal strength versus measured signal strength) associated with the received navigational signals, position uncertainty index (e.g., a position, velocity, timing (PVT) solution accuracy output) associated with the received navigational signals, or any combination thereof.

Furthermore, the UE 10 may determine if the signal quality data meets or is within a threshold range of (e.g., within a threshold amount greater than and/or less than) a signal quality threshold (e.g., signal accuracy threshold, signal quality parameter, performance value). In particular, in some embodiments, the UE 10, via the processor 12, may track (e.g., monitor) and/or accumulate positional data and/or signal quality data associated with one or more respective navigational signals (e.g., historical positional data, historical signal quality data) received by the UE 10 over time (e.g., one day, two days, three days, one week, one month, etc.). The UE 10 may additionally associate the tracked and/or accumulated signal quality data with a respective geographic location of the UE 10 within which the one or more navigational signals were received. Based on the tracked and/or accumulated signal quality data, the UE 10 may determine and/or set, via the processor 12, one or more signal quality thresholds, and may associated the one or more signal quality thresholds with the one or more respective geographic locations of the UE 10 in which the one or more respective navigational signals were received. In this way, the UE 10 may determine the one or more signal quality thresholds based on historical context data, which may include tracked and/or accumulated signal quality data determined by the UE 10 over time associated with the one or more respective geographic locations of the UE 10.

Moreover, the one or more signal quality thresholds may be indicative of the greatest potential signal quality and/or positional, navigational, and/or timing information accuracy that may be associated with one or more navigational signals received by the UE 10 within a geographic area. For example, the UE 10 may utilize the default SV tracking mode of tracking all available SVs 108 for a period of time within a geographic area (e.g., one or more locations within the geographic area), to determine and/or set, via the processor 12, the one or more signal quality thresholds and associated the one or more signal quality thresholds with the geographic area. The UE 10 may additionally store the one or more signal quality thresholds, an indication of one or more signal quality thresholds, an association of the one or more signal quality thresholds with the geographic area, or any combination thereof in the memory 14 and/or storage 16 of the UE 10. Additionally or alternatively, the one or more signal quality thresholds, the indication of one or more signal quality thresholds, the association of the one or more signal quality thresholds with the geographic area, or any combination thereof, may be stored in a database associated with the wireless communication network 102, and transmitted to the UE 10 (e.g., as signal environment data).

In addition, as the UE 10 receives additional one or more navigational signals within the geographic area, the UE 10 may determine and/or sets one or more additional signal quality thresholds (e.g., based on determined one or more additional signal characteristics). In particular, the UE 10 may determine and/or store a new association of the geographic area with the one or more additional signal quality thresholds. In this way, the UE 10 may update (e.g., continuously update) the one or more signal quality thresholds based on historical context data, which may indicate tracked and/or accumulated signal quality data determined by the UE 10 (e.g., based on received navigational signals), over time within the geographic area (e.g., at one or more locations of the geographic area).

It should be appreciated that although the one or more signal quality thresholds may be described as based on historical context data, in some embodiments, the one or more signal quality thresholds may be determined by the wireless communication network 102 and/or the satellite-based radionavigation system network 106 and may be transmitted to the UE 10. Additionally or alternatively, the one or more signal quality thresholds may be transmitted, via an additional network communicatively coupled to the UE 10, by another UE communicatively coupled to the UE 10 (e.g., via the wireless communication network 102 and/or the satellite-based radionavigation system network 106). In some embodiments, the one or more signal quality thresholds may be based on a signal environment (e.g., signal environment data received, via the receiver 54, by the UE 10) associated with a geographic area within which the UE 10 is located. In additional or alternative embodiments, the one or more signal quality thresholds may be associated with a geofenced area.

As described in more detail below, the UE 10 may determine geographic areas (e.g., locations) to utilize the efficient SV tracking mode based on signal quality data associated with one or more respective navigational signals received by the UE 10 within the geographic area meeting and/or being with a threshold range of the one or more signal quality thresholds. In particular, the UE 10 may determine the signal quality data based on positional data received by the UE 10 from one or more SVs tracked by the UE 10 utilizing the efficient SV tracking mode. As discussed herein, in some embodiments, the one or more signal quality thresholds may be determined based on historical context data, that may be indicative of tracked and/or accumulated signal quality data associated with one or more navigational signals received by the UE 10 within the geographic area from one or more SVs tracked by the UE 10 utilizing the default SV tracking mode. The system and methods described herein enable the UE 10 to implement the efficient SV tracking mode (e.g., decrease in a number of satellites tracked by the UE 10) based on determining the geographic areas that are associated with successful use of the efficient SV tracking mode. In addition, when using the efficient SV tracking mode, the UE 10 may reduce power consumption and/or reduce use of processing resources associated with navigation and/or positional data (e.g., optimize power and/or processing resources of the UE 10), while maintaining relatively consistent signal quality of the positional data received by the UE 10 within the geographic area (e.g., as compared to signal quality associated with use of the default SV tracking mode at the geographic areas).

Figure 6:
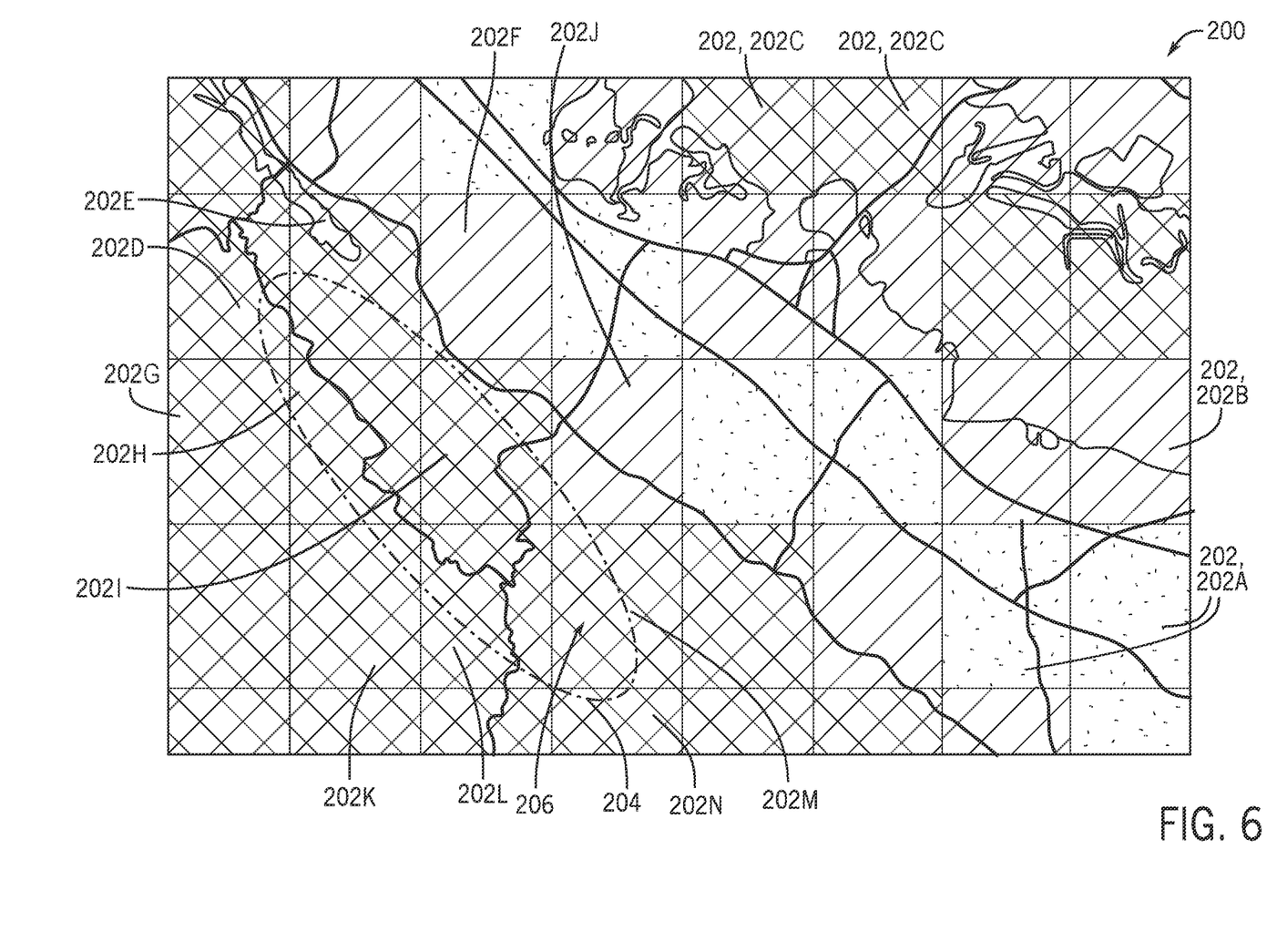
FIG. 6 is a schematic diagram of a geographic area including signal environment tiles and a geofenced area, according to embodiments of the present disclosure.

FIG. 6 is a schematic diagram of a geographic area 200 including one or more signal environment tiles 202 and a geofenced 204 surrounding a geofenced area 206; according to embodiments of the present disclosure. In particular, the geographic area 200 may be sectioned off (e.g., divided, separated) by the one or more of the signal environment tiles 202. It should be appreciated that although FIG. 6 illustrates the geographic area 200 associated with a portion of San Francisco, Bay Area, in other embodiments, the geographic area 200 may be smaller or larger, and/or may encompass additional or alternative geographic regions and/or areas. In some embodiments, the geographic area 200 may encompass an entirety of a surface of the Earth. Furthermore, each of the signal environment tiles 202 may cover the geographic area 200 and be rectangular in shape. In particular, the signal environment tiles 202 may each have sides measuring 5 kilometers (km) in length and encompass a 25 km$^2$ portion of the geographic area 200. In addition, each of the signal environment tiles 202 may be substantially equal in size and/or area (e.g., encompass substantially a same size portion of the geographic area 200). Furthermore, the one or more signal environment tiles 202 may be positioned relative to each other such that each side of a signal environment tile 202 is share by another adjacent signal environment tile 202. It should be appreciated that in some embodiments, each of the signal environment tiles 202 may encompass a smaller or a larger portion of the geographic area 200 (e.g., 20 km$^2$, 30 km$^2$, 50 km$^2$). In addition, in some embodiments, the one or more signal environment tiles 202 may be of any shape that may create a tessellation (e.g., tiling) pattern on a plane (e.g., on the geographic area 200), such that there are no gaps and/or overlaps between the one or more signal environment tiles 202.

Each of the one or more signal environment tiles 202 may be associated with a signal environment (e.g., signal environment data). In particular, the signal environment may include categories such as dense urban, urban, suburban, or rural (e.g., benign, foliage). In addition, each of the categories of the signal environment may be associated with a color. For example, in FIG. 6, a first signal environment tile 202A is categorized as dense urban and associated with a red color (illustrated in FIG. 6 as stippled), a second signal environment tile 202B is categorized as urban and associated with a yellow color (illustrated in FIG. 6 as striped), and a third signal environment tile 202C is categorized as rural and associated with a green color (illustrated in FIG. 6 as cross-hatched). The category of the signal environment (e.g., the signal environment tile) may be determined based on one or more characteristics of the portion of the geographic area 200 encompassed by the respective signal environment tile 202. For example, the one or more characteristics of the portion of the geographic area 200 may include average building size, Wi-Fi density, topography of a surface of the geographic area, or any combination thereof. In particular, the dense urban and urban categories may be associated with a higher average building size and a higher Wi-Fi density than an average building size and Wi-Fi density of the suburban and/or the rural categories. Furthermore, the category of the signal environment may correlate to expected signal quality data that may be determined based on one or more respective navigational signals received by a UE 10 located within the respective signal environment (e.g., respective signal environment tile 202). In particular, the category of the signal environment and/or the color of the signal environment tile 202 may be associated with an amount of signal interference that may affect signal quality and/or positional, navigational, and/or timing information accuracy associated with one or more navigational signals received within the respective signal environment (e.g., respective signal environment tile 202).

In addition, the geographic area 200 may include one or more geofences 204, wherein each of the one or more geofences 204 encompasses a respective geofenced area 206. The geofenced area 206 may include at least a portion of one or more signal environment tiles 202. As illustrated in FIG. 6, the geofenced area 206 overlaps and/or encompasses portions of signal environment tiles 202D, 202E, 202F, 202G, 202H, 202I, 202J, 202K, 202L, and 202M. In some embodiments the geofenced area 206 may encompass and/or include an entire signal environment tile 202 or an entire group of two or more signal environment tiles 202. In some embodiments, the geofenced area 206 may be smaller in size (e.g., area) than a size (e.g., area) of the signal environment tile 202, and may encompass and/or include a portion of the signal environment tile 202. As discussed in more detail below, the geofenced area 206 may correspond to a geographic area associated with implementation of the efficient SV tracking mode. In particular, the geofenced area 206 and/or the geofence 204 may be determined based on the historical context data determined by the UE 10 over time. In particular, the UE 10 may utilize the efficient SV tracking mode in a geographic location, and the geographic location may be marked by a geofence 204 and/or included in a geofenced area 206 based on the signal quality data associated with one or more navigational signals received by the UE 10 within the geographic location meeting and/or being with a threshold range of the one or more signal quality thresholds. In some embodiments, the geofence 204 and/or the geofenced area 206 may be updated (e.g., changed, increased, decreased, adjusted) over time based on the historical context data associated with the one or more navigational signals receive by the UE 10 over time.

The UE 10 may store, via the memory 14 and/or storage 16, the signal environment data associated with the geographic area 200 and/or with one or more signal environment tiles 202 associated with a geographic area 200. In some embodiments, the UE 10 may store an indication of the signal environment data and/or the one or more signal environment tiles 202 associated with the geographic area 200 in the memory 14 and/or the storage 16 of the UE 10. Additionally or alternatively, the signal environment data and/or signal environment tiles 202 associated with the geographic area 200, and/or the indication of the signal environment data and/or signal environment tiles 202 associated with the geographic area 200 may be stored in a database associated with the wireless communication network 102, and may be transmitted, via the base station 104, to the UE 10. Furthermore, in some embodiments, the UE 10 may store one or more geofences 204 and/or one or more geofenced areas 206 associated with a geographic area 200 or an indication of the one or more geofences 204 and/or the one or more geofenced areas 206 in the memory 14 and/or the storage 16 of the UE 10. Additionally or alternatively, one or more geofences 204 and/or the one or more geofenced areas 206 associated with a geographic area 200 or an indication of the one or more geofences 204 and/or the one or more geofenced areas 206 may be stored in a database associated with the wireless communication network 102, and may be transmitted, via the base station 104, to the UE 10.

Figure 7:
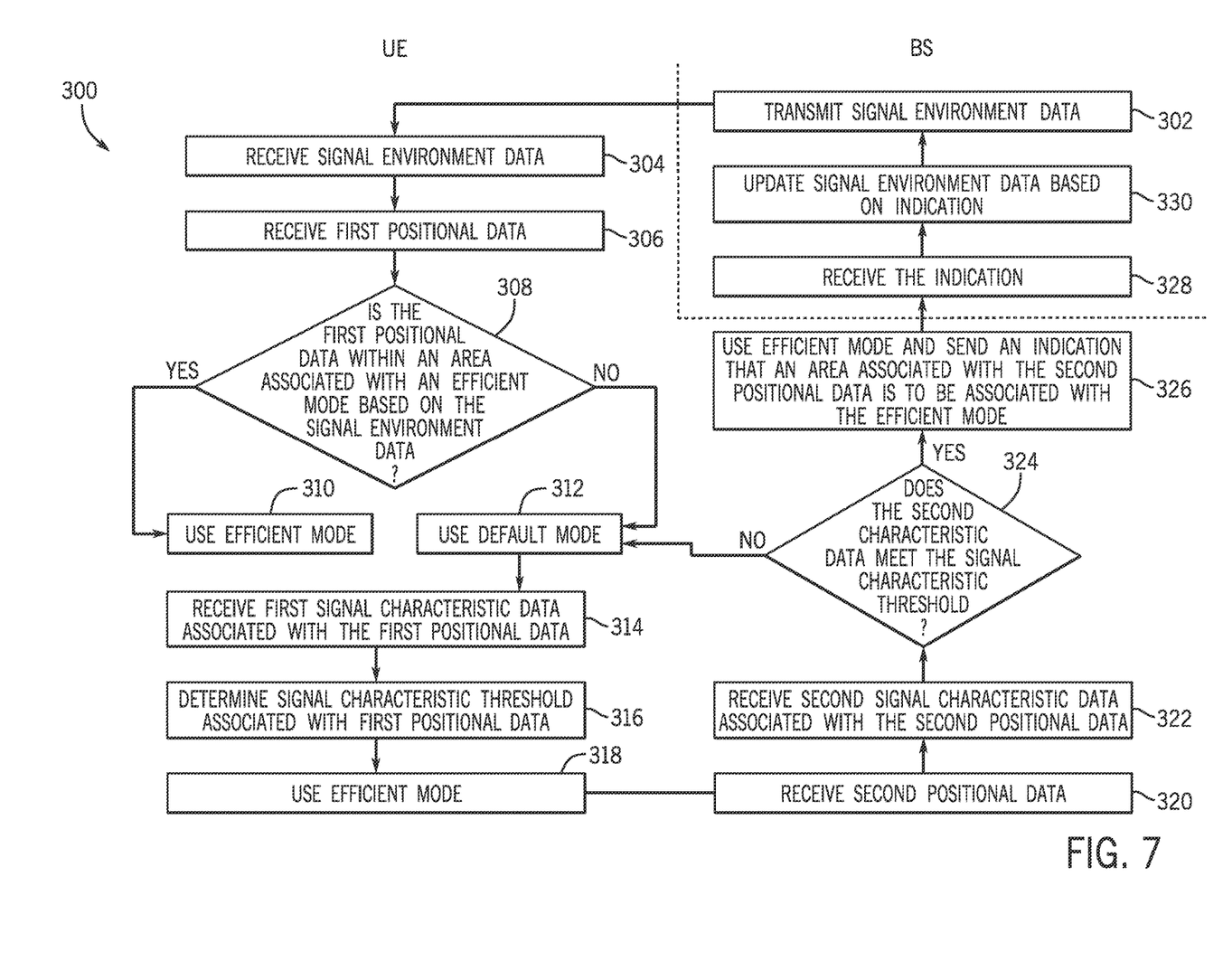
FIG. 7 is a flowchart of a method for user equipment to implement the efficient SV tracking mode based on signal environment data associated with a geographical area, according to embodiments of the present disclosure.

FIG. 7 is a flowchart of a self-learning method 300 for the UE 10 to implement the efficient SV tracking mode based on signal environment data associated with a geographical area, according to embodiments of the present disclosure. Any suitable device (e.g., a controller) that may control components of the UE 10, such as the processor 12, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system of the UE 10, one or more software applications of the UE 10, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the base station 104 (e.g., the wireless communication network 102) may transmit (e.g., send) signal environment data to the UE 10. The signal environment data may include an indication of one or more signal environment tiles 202 and/or one or more geofenced areas 206 (e.g., one or more geofences 204) associated with a geographic area in which the UE 10 is located. In some embodiments, the signal environment data may include an indication of association of the one or more signal environment tiles 202 and/or one or more geofenced areas 206 (e.g., one or more geofences 204) with implementation of the efficient SV tracking mode. Additionally or alternatively, the signal environment data may include an indication of association of the one or more signal environment tiles 202 and/or one or more geographic areas with implementation of the default SV tracking mode. Furthermore, the signal environment data may include an indication of one or more signal environment tiles 202 and/or one or more geofenced areas 206 associated with all or a portion of a geographical surface of the Earth. In some embodiments, the base station 104 may transmit an indication of an update (e.g., a change, an adjustment of) to the signal environment data to the UE 10. Furthermore, in process block 304, the UE 10 may receive, via the receiver 54, the signal environment data from the base station 104 (e.g., the wireless communication network 102). In some embodiments, the UE 10 may receive the indication of the update and download, and/or receive the signal environment data via the Internet, a network operator or both.

In process block 306, the UE 10 may receive first positional data (e.g., positional and/or timing data) from a plurality of satellite vehicles (SV) 108 (e.g., from the satellite-based radio navigation system network 106). In some embodiments, the UE 10 may be using the default SV tracking mode of tracking all available SVs 108 associated with a location of the UE 10. The UE 10 may establish a connection with one or more of the available SVs 108 and may receive the first positional data from the one or more SVs 108. Furthermore, the UE 10 may determine, via the processor 12, the location (e.g., geo-spatial location, geographic location) of the UE 10 based on the received positional data. Additionally, in process block 308, the UE 10 may determine, via the processor 12, if the first positional data and/or the location of the UE 10 based on the first positional data is within an area (e.g., geographic area) associated with use of the efficient SV tracking mode (e.g., automatic implementation of the efficient SV tracking mode). In particular, as discussed herein, the UE 10 may receive the signal environment data (e.g., stored in the memory 14 and/or storage 16, received from the base station 104) associated with the location of the UE 10. The UE 10, via the processor 12, may determine that the UE's 10 location is located within a signal environment (e.g., signal environment tile 202) and/or a geofenced area 206 (e.g., geofence 204) associated with implementation of the efficient SV tracking mode. In particular, in some embodiments, the UE 10 may determine, via the processor 12, that the UE's 10 location based on the received first positional data is located within a signal environmental tile 202 categorized as rural (e.g., green environmental tile 202C, cross-hatched environmental tile 202C of FIG. 6). Furthermore, the rural environmental tile 202C may be associated with implementation of the efficient SV tracking mode.

In process block 310, if the UE 10 determines that the location of the UE 10 based on the received first positional data is within an area associated with the efficient SV tracking mode, the UE 10 may implement (e.g., automatically implement) the efficient SV tracking mode. In particular, as discussed herein, the efficient SV tracking mode may enable the UE 10 to search and/or track a fewer number of SVs 108 of the total available SVs 108 than a number of SVs 108 tracked when the UE 10 uses the default SV tracking mode. In this manner, the method 300 may enable the UE 10 to implement the efficient SV tracking mode (e.g., decrease a number of SVs 108 tracked by the UE 10) based on a determination that the location of the UE 10 is within an area associated with successful use of the efficient SV tracking mode. In addition, use the efficient SV tracking mode by the UE 10 may reduce power consumption and/or reduce use of processing resources of the UE 10 associated with navigation and/or positional data (e.g., optimize power and/or processing resources of the UE 10), while maintaining consistent signal quality and/or positional, navigational, and/or timing information accuracy of the positional data received by the UE 10 in the area associated with the efficient SV tracking mode.

In process block 312, if the UE 10 determines that the location of the UE 10 is not within an area associated with the efficient SV tracking mode, the UE 10 may utilize the default SV tracking mode of tracking all available SVs 108 for receiving navigational and/or positional data in the location. Furthermore, in some embodiments, the UE 10 may evaluate a potential for successful use of the efficient SV tracking mode at the location of the UE 10, while maintaining consistent signal quality and/or positional, navigational, and/or timing information accuracy of the positional data received by the UE 10. To do so, in process block 314, the UE 10 may receive and/or determine, via the processor 12, first signal characteristic data associated with the received first positional data. In particular, the first signal characteristic data may be signal quality data (e.g., signal quality data and/or positional, navigational, and/or timing information accuracy data) associated with the first positional data. As discussed herein, the signal quality data may be determined (e.g., calculated) based on a received signal strength level (e.g., received GNSS signal strength level, TOP 4+N) associated with the received positional data, a visibility index (e.g., a ratio of tracked satellites to total visible satellites, expected signal strength versus measured signal strength) associated with the received positional data, position uncertainty index (e.g., a position, velocity, timing (PVT) solution accuracy output), or any combination thereof.

In process block 316, the UE 10 may receive and/or determine one or more signal characteristic thresholds (e.g., signal parameters, signal metrics, performance metrics, performance values) associated with the received first positional data (e.g., the location associated with the received positional data). In particular, the UE 10 may determine, via the processor 12, the one or more signal characteristic thresholds based on the first signal characteristic data associated with the received first positional data. Additionally, in some embodiments, the UE 10 may store the one or more signal characteristic thresholds in the memory 14 and/or storage 16 of the UE 10. Additionally or alternatively, the UE 10 may store an indication of the one or more signal characteristic thresholds in the memory 14 and/or storage 16 of the UE 10. In some embodiments, the one or more signal characteristics thresholds may be indicative of one or more signal characteristic data associated with positional data received by the UE 10 at the determined location of the UE 10 over time. Additionally or alternatively, the one or more signal characteristics thresholds may be indicative of one or more signal characteristic data determined by the UE 10 at one or more locations of the UE 10 over time. As discussed herein, the UE 10, via the processor 12, may track (e.g., monitor) and/or accumulate one or more signal characteristic data associated with one or more received positional data by the UE 10 over time (e.g., one day, two days, three days, one week, one month, etc.). The UE 10 may additionally associate the tracked and/or accumulated one or more signal characteristic data with one or more respective locations of the UE 10 within which the one or more positional data were received. Based on the tracked and/or accumulated one or more signal characteristic data, the UE 10 may determine and/or set, via the processor 12, the one or more signal characteristic thresholds, and may associated the one or more signal characteristic thresholds with the one or more respective locations of the UE 10. In this way, the UE 10 may determine the one or more signal characteristic thresholds based on historical context data, which may be indicative of the tracked and/or accumulated one or more signal characteristic data determined by the UE 10 at the one or more geographic locations over time. In some embodiments, the one or more signal characteristic thresholds may be an average (e.g., mean) of the one or more signal characteristic data determined based on the received positional data. Additionally or alternatively, in some embodiments, the one or more signal characteristic thresholds may be a mode, a range, a median, a minimum (e.g., smallest and/or lowest) data value, and/or a maximum (e.g., largest and/or highest) data value of the one or more signal characteristic data determined based on the received positional data.

In process block 318, the UE 10 may (e.g., in response to setting the one or more signal characteristics thresholds) implement, via the processor 12, the efficient SV tracking mode. In particular, as discussed herein, the efficient SV tracking strategy may enable the UE 10 to search and/or track fewer SVs 108 than a number of SVs tracked while using the default SV tracking mode. In this way, the efficient SV tracking mode may enable the UE 10 to search and/or track a fewer number of SVs 108 of the total available SVs 108 than a number of SVs 108 tracked when the UE 10 uses the default SV tracking mode. In this manner, the method 300 may enable the UE 10 to evaluate a potential for use of the efficient SV tracking mode at the location when the location of the UE 10 is not within an area associated with successful use of the efficient SV tracking mode (e.g., area is associated with use of the default SV tracking mode).

In process block 320, the UE 10 may receive second positional data (e.g., positional and/or timing data) from a plurality of SVs 108 (e.g., from the satellite-based radionavigation system network 106) that are tracked using the efficient SV tracking mode. In particular, the UE 10 may establish a connection with one or more of the plurality of SVs 108 tracked using the efficient SV tracking mode and may receive the second positional data from the one or more SVs 108. Furthermore, in process block 322, the UE 10 may receive and/or determine, via the processor 12, second signal characteristic data associated with the received second positional data. In particular, the second signal characteristic data may be signal quality data (e.g., signal quality data and/or positional, navigational, and/or timing information accuracy data) associated with the second positional data. As discussed herein, the signal quality data may be determined (e.g., calculated) based on a received signal strength level (e.g., received GNSS signal strength level, TOP 4+N) associated with the received positional data, a visibility index (e.g., a ratio of tracked satellites to total visible satellites, expected signal strength versus measured signal strength) associated with the received positional data, position uncertainty index (e.g., a position, velocity, timing (PVT) solution accuracy output), a heat map generated based on previous global navigation satellite system data, or any combination thereof.

In process block 324, the UE 10 may determine, via the processor 12, if the second signal characteristic data meets the one or more signal characteristic thresholds. In particular, the UE 10 may compare, via the processor, the second signal characteristic data to the one or more signal characteristic thresholds to determine if the second signal characteristic data meets and/or is within a threshold amount of the one or more signal characteristic thresholds. In this way, the UE 10 may determine, via the processor, if the UE 10 is receiving second positional data that is consistent in signal quality and/or positional, navigational, and/or timing information accuracy as compared to the signal quality and/or positional, navigational, and/or timing information accuracy of the received first positional data, while the UE 10 is utilizing the efficient SV tracking mode at the determined location of the UE 10. If the UE 10 determines that the second signal characteristics data meets and/or is within the threshold amount of the one or more signal characteristic thresholds, in process block 326, the UE 10 may continue to implement the efficient SV tracking mode. In particular, as discussed herein, the efficient SV tracking mode may enable the UE 10 to search and/or track a fewer number of SVs 108 of the total available SVs 108 than a number of SVs 108 tracked when the UE 10 uses the default SV tracking mode (e.g., reduce an amount of satellite and/or navigational resources when compare to an amount of satellite and/or navigational recourses used in the default SV tracking mode). In this manner, the method 300 may enable the UE 10 to implement the efficient SV tracking mode (e.g., decrease a number of SVs 108 tracked by the UE 10) based on a determination that the second signal characteristics data meets and/or is within the threshold amount of the one or more signal characteristic thresholds. In addition, use the efficient SV tracking mode by the UE 10 may reduce power consumption and/or reduce use of processing resources of the UE 10 associated with navigation and/or positional data (e.g., optimize power and/or processing resources of the UE 10), while maintaining consistent signal quality and/or positional, navigational, and/or timing information accuracy of the positional data received by the UE 10.

Continuing with process block 326, if the UE 10 determines that the second signal characteristics data meets and/or is within the threshold amount of the one or more signal characteristic thresholds, the UE 10 may transmit (e.g., send) an indication of an association of an area associated with the received second positional data (e.g., the determined location of the UE 10) with implementation and/or successful use of the efficient SV tracking mode. In particular, in some embodiments, the UE 10 may transmit the indication to the wireless communication network 102 (e.g., base station 104, a radio access network). In process block 328, the wireless communication network 102 may receive the indication and, in process block 330, the wireless communication network 102 may update signal environment data based on the indication. In some embodiments, an operator of the wireless communication network 102 may receive the indication and update the signal environment data based on the indication. In particular, as discussed herein, the signal environment data may include an indication of one or more signal environment tiles 202 and/or one or more geofenced areas 206 associated with a geographic area. Furthermore, the wireless communication network 102 may update the signal environment data by including the area (e.g., the determined location of the UE 10) associated with the successful use of the efficient SV tracking mode in an existing geofenced area 206 and/or mark the area associated with the successful use of the efficient SV tracking mode with a geofence 204. As discussed herein, the geofenced area 206 may correspond to a geographic area associated with implementation of the efficient SV tracking mode. Additionally or alternatively, the wireless communication network 102 may update the signal environment data by updating one or more signal environment tiles 202. For example, if the area associated with the successful use of the efficient SV tracking mode encompasses an entirety and/or at least a threshold amount of a signal environment tile 202, the wireless communication network 102 may change a category of the signal environment tile 202 to a rural signal environment tile 202C (e.g., green, cross-hatched). As discussed herein, the rural signal environment tile 202C may be associated with implementation of the efficient SV tracking mode. The method 300 may return to process block 302, wherein the base station 104 (e.g., the wireless communication network 102) may transmit (e.g., send) the signal environment data (e.g., updated signal environment data) to the UE 10.

Returning to process block 324, if the UE 10 determines that the second signal characteristics data does not meet and/or is not within the threshold amount of the one or more signal characteristic thresholds, in process block 312, the UE 10 may return to use of the default SV tracking mode of tracking all available SVs 108 for receiving navigational and/or positional data. In some embodiments, when a location is not associated with implementation of the efficient SV tracking mode, the UE 10 may continue to evaluate the potential for successful use of the efficient SV tracking mode at the location. For example, the UE 10 may continue, via the processor 12, through process blocks 314-324 at predetermined intervals (e.g., once a week, once a month, twice a month) for one or more locations of the UE 10 that are not associated with successful implementation of the efficient SV tracking mode. In some embodiments, the UE 10 may continue through process blocks 314-324 based on receiving an indication of successful use of the efficient SV tracking mode at a location of the UE 10. For example, the UE 10 may receive an indication from the wireless communication network 102, based on received signal environment data, from another UE communicatively coupled to the UE 10, or any combination thereof.

In some embodiments, the UE 10 may receive the indication based on the signal quality characteristic data associated with received positional data meeting or exceeding by a threshold amount one or more signal quality data thresholds while the UE 10 is using the default SV tracking mode. For example, the UE 10 may determine that signal quality characteristic data determined based on the received positional data while in the default SV tracking mode has been exceeding one or more signal quality thresholds over an amount of time. This determination may indicate to the UE 10 that the one or more locations associated with the received positional data may be evaluated for potential successful use of the efficient SV tracking mode. In some embodiments, in response to determining that the signal quality characteristic data has been exceeding one or more signal quality thresholds over an amount of time at the one or more locations, the UE 10 may implement the efficient SV tracking mode, when the UE 10 is at the one or more locations and evaluate the received positional data for successful use of the efficient SV tracking mode (e.g., process blocks 314-324).

Method 300 may provide a continuous self-learning method of updating signal environment data and thus updating areas associated with implementation (e.g., automatic implementation) of the efficient SV tracking mode. Although the method 300 is described as occurring between one UE 10 and one base station 104 (e.g., wireless communication network 102), it should be appreciated that the method 300 may include multiple UEs 10 and multiple base stations 104 each coupled to the wireless communication network 102. Additionally, in some embodiments, the multiple UEs 10 may be communicatively coupled to each other, via the wireless communication network 102, and may share updated signal environment data between each other. In particular, a first UE 10 and a second UE 10 may be located in a same geographic area and coupled to the same wireless communication network 102. The first UE 10 may determine that the geographic area is associated with use of the efficient SV tracking mode. Furthermore, the first UE 10 may update signal environment data associated with the geographic area, and the second UE 10 may receive the updated signal environment data. The second UE 10 may implement use of the efficient SV tracking mode in the geographic area based on receiving the updated signal environment data.

Figure 8:
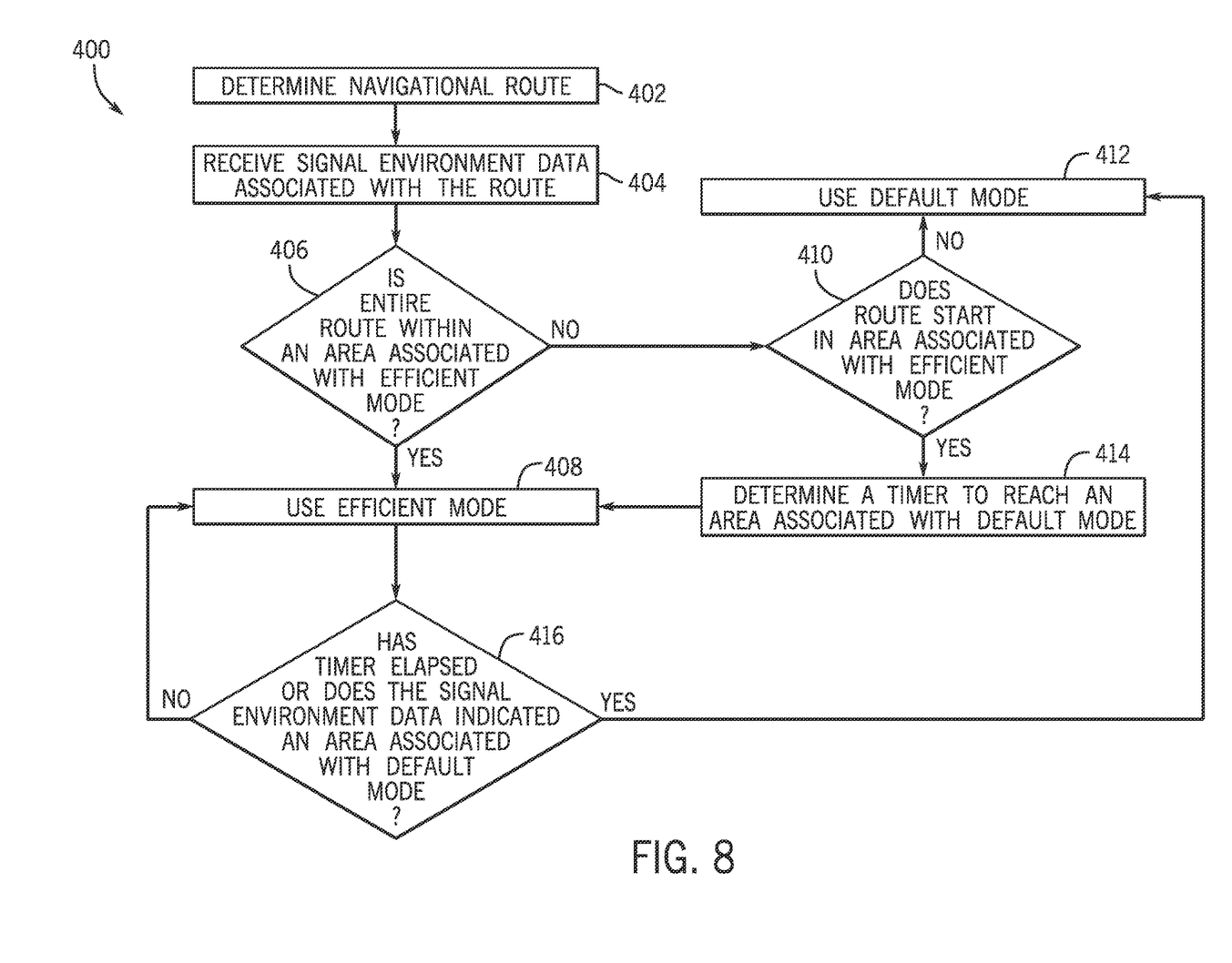
FIG. 8 is a flowchart of a method for user equipment to implement the efficient SV tracking strategy mode based on signal environment data and/or a timer associated with a navigational route, according to embodiments of the present disclosure.

FIG. 8 is a flowchart of a method 400 for the UE 10 to implement the efficient SV tracking mode based on signal environment data associated with a navigational route, according to embodiments of the present disclosure. Any suitable device (e.g., a controller) that may control components of the UE 10, such as the processor 12, may perform the method 400. In some embodiments, the method 400 may be implemented by executing instructions stored in a tangible, non-transitory, computer-readable medium, such as the memory 14 or storage 16, using the processor 12. For example, the method 400 may be performed at least in part by one or more software components, such as an operating system of the UE 10, one or more software applications of the UE 10, and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the UE 10 may determine, via the processor 12, a navigational route. For example, the UE 10 may use a navigational application (e.g., navigational software) located on the UE 10 and determine a navigational route from a first position (e.g., current location of the UE 10, a first location) to a second location (e.g., destination, desired location, end location of the navigational route). In addition, in process block 404, the UE 10 may receive signal environment data associated with the navigational route. In some embodiments, as discussed herein, the UE 10 may receive signal environment data (e.g., from the wireless communication network 102) associated with one or more locations. Additionally or alternatively, in some embodiments, the UE 10 may retrieve signal environment data stored in the memory 14 and/or the storage 16 of the UE 10. The UE 10 may receive the signal environment data associated with the navigational route based on a location of a pathway of the navigational route and/or one or more portions of a pathway of the navigational route intersecting one or more environmental tiles 202. In particular, the UE 10 may determine one or more portions of the navigational route may intersect and/or travel through one or more respective signal environment tiles 202. Furthermore, the UE 10 may receive the signal environment data associated with each of the one or more portions of the navigational route based on the one or more characteristics associated with each of the intersected signal environmental tiles 202. Additionally or alternatively, the UE 10 may receive the signal environment data associated with the navigational route based on a location of the navigational route and/or one or more portions of the navigational route intersecting or traveling through one or more geofenced areas 206 (e.g., one or more geofences). In particular, the UE 10 may determine one or more portions of the navigational route may intersect and/or travel through one or more respective geofences 204 and/or geofenced areas 206.

In process block 406, the UE 10 may determine, via the processor 12, if an entirety of the navigational route is within an area associated with implementation of the efficient SV tracking mode, based on the received signal environment data associated with the navigational route. In particular, as discussed herein, the rural category of the signal environment tiles 202 and/or the geofenced area 206 encompassed by the geofence 204 may be associated with implementation and/or successful use of the efficient SV tracking mode. If the UE 10 determines that the navigational route (e.g., all portions of the route) are within an area associated with the efficient SV tracking mode, in process block 408, the UE 10 may use the efficient SV tracking mode while the UE 10 travels the entirety of the navigational route.

If the UE 10 determines that the navigational route (e.g., at least a portion of the navigational route) intersects one or more areas associated with the default SV tracking mode (e.g., not associated with the efficient SV tracking mode), in process block 410, the UE 10 may determine, via the processor 12, if a starting location (e.g., initial location of the route) of the navigational route is located in an area associated with the efficient SV tracking mode. If the UE 10 determines that the starting location of the navigational route is not located in an area associated with the efficient SV tracking mode, in process block 412, the UE 10 may use the default SV tracking mode for the entirety of the navigational route. On the other hand, if the UE 10 determines that the starting point of the navigational route is located in an area associated with the efficient SV tracking mode, in process block 414, the UE 10 may determine and/or set, via the processor 12, a timer indicative of a time to reach an area associated with the default SV tracking mode (e.g., not associated with the efficient SV tracking mode). In particular, the timer may enable use of the efficient SV tracking mode along the navigational route for a pre-determined amount of time (e.g., dictated by the time set by the timer) based on the signal environment data associated with the navigational route until a location of the UE 10 reaches an area associated with the default SV tracking mode. A duration of each of the one or more timer ranges of the respective one or more timers (e.g., the one or more second timers) may be determined based on one or more points (e.g., locations) where the navigational route intersects the one or more areas associated with implementation of the efficient SV tracking mode. Additionally or alternatively, a duration of the timer may be determined based on a distance between the starting point of the navigational route and a point (e.g., location) where the navigational route intersects the area associated with the implementation of the default SV tracking mode. In addition, the duration of the timer may be based on a combination of the distance and the UE's 10 current, measured and/or predicted speed.

In particular, the method 400 may continue to process block 408, and the UE 10 may use the efficient SV tracking mode along the navigational route for a time dictated by the timer. For example, a start of the timer may indicate start of use of the efficient SV tracking mode, while an end of the timer may indicate end of the use of the efficient SV tracking mode (e.g., start of use of the default SV tracking mode). As in the foregoing example, use and/or end of use of the efficient SV tracking mode may be associated with elapsing of the timer. In process block 416, during use of the efficient SV tracking mode along the navigational route, the UE 10 may determine, via the processor 12, if the timer has elapsed (e.g., end of timer is reached). Additionally or alternatively, the UE 10 may determine, via the processor 12, if the signal environment data indicates a current position of the UE 10 is located in an area associated with the default SV tracking mode. In some embodiments, the UE 10 may receive an indication that the timer has elapsed and/or that the current position of the UE 10 is located in an area associated with the default SV tracking mode. If the timer has elapsed and/or if the positon of the UE 10 is located within an area associated with the default SV tracking mode, the UE 10 may implement the default SV tracking mode for the remainder of the navigational route.

However, if the timer has not elapsed and/or if the position of the UE 10 is not located in an area associated with the default SV tracking mode, the UE 10 may continue to implement the efficient SV tracking mode (block 408) along the navigational route. Additionally, the UE 10 may continue to check if the timer has elapsed and/or if a position of the UE 10 is located in an area associated with the default SV tracking mode for the remainder of the navigational route. In this way, the method 400 enables the UE 10 to implement the efficient SV tracking mode (e.g., decrease in a number of satellites tracked by the UE 10) along a pre-determined navigational route, while maintaining consistent signal quality and/or positional, navigational, and/or timing information accuracy of the positional data received by the UE 10 along the navigational route. As discussed herein, use of the efficient SV tracking mode by the UE 10 may reduce power consumption and/or reduce use of processing resources associated with receiving and/or processing navigation and/or positional data (e.g., optimize power and/or processing resources of the UE 10).

When implementing the efficient SV tracking mode, the UE 10 may exit (e.g., stop use of) the efficient SV tracking mode at any time along the navigational route and/or with areas associated with the efficient SV tracking mode based on received signal environment data and/or determined signal quality characteristic data associated with received positional data. In particular, the UE 10 may exit the efficient SV tracking mode when the one or more signal quality characteristic data associated with received positional data does not meet or is not within a threshold amount of the one or more signal quality thresholds. In some embodiments, the thresholds may be determined by the received signal environment data, and thus, the UE 10 may receive updated signal environment data that includes updated one or more signal quality thresholds. The UE 10 may determine that the one or more signal quality characteristics data associated with the received positional data does not meet or is not within a threshold amount of the one or more updated signal quality thresholds. The UE 10 may then exit the efficient SV tracking mode and use the default SV tracking mode to maintain consistent signal quality and/or positional, navigational, and/or timing information accuracy of the positional data received by the UE 10. Additional examples of signal environment data and/or determined signal quality characteristics data that may cause the UE 10 to exit the efficient SV tracking mode are signal coexistence situations (e.g., signal interference, interference with signals transmitted and/or received by the receiver 54), reacquisition situations (e.g., traveling and/or located in a tunnel, underground, etc.), and/or measurements of signal quality of one or more of the available satellites (e.g., one or more of the available satellites have a low signal quality, relatively low CN/0 measurement).

Embodiments herein provide for an efficient SV tracking mode (e.g., SV search and/or tracking strategy, reduction in satellites tracked, reduction in navigational resources) that, when utilized by a UE, consumes less power and/or computing resources of the UE than a default SV tracking mode (e.g., the default SV search and/or tracking strategies, tracking all available SVs, increase in satellites tracked, increase in navigational resources), while maintaining consistent signal quality data and/or positional, navigational, and/or timing information accuracy data. In particular, use of the efficient SV tracking mode may be determined and implemented based on a signal environment (e.g., signal characteristics data associated with a location) of the UE. Furthermore, the efficient SV tracking mode may be associated with one or more locations based on a determination that one or more signal quality and/or positional, navigational, and/or timing information accuracy thresholds are met during use of the efficient SV tracking mode at the one or more locations. Additionally or alternatively, the one or more locations may be associated with a geofenced area. The geofenced area may define a geographical area corresponding to implementation of the efficient SV tracking mode by a UE located within the geofenced area. In addition, in some embodiments, the association of the one or more locations with the efficient SV tracking mode and/or the one or more geofenced areas may be determined based on historical context data indicative of the UE's successful use of the efficient SV tracking mode at the one or more locations over time. Moreover, the signal environment (e.g., signal environment data) and/or the geofenced areas may be updated based on the historical context data. In some embodiments, at least a portion of a navigational route of the UE may be associated with implementation of the efficient SV tracking mode based on the signal environment, the one or more geofenced areas, the historical context data, or any combination thereof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
   a global navigation satellite system receiver; and
   one or more processors coupled to the global navigation satellite system receiver, the one or more processors configured to
      receive first positional data associated with the electronic device via the global navigation satellite system receiver when operating using a first set of global navigation satellite system resources,
      receive first performance values associated with the first set of global navigation satellite system resources,
      receive second positional data associated with the electronic device via the global navigation satellite system receiver when operating using a second set of global navigation satellite system resources, the second set of global navigation satellite system resources being less than the first set of global navigation satellite system resources,
      receive second performance values associated with the second set of global navigation satellite system resources,
      continue operating using the second set of global navigation satellite system resources based on the second performance values being within a threshold range of the first performance values, and
      switch to operating using the first set of global navigation satellite system resources based on the second performance values not being within the threshold range of the first performance values.

2. The electronic device of claim 1, wherein the first performance values and the second performance values are associated with a global navigation satellite system signal strength, a ratio of tracked global navigation satellite system satellites to available global navigation satellite system satellites, a position and velocity accuracy output, a heat map generated based on previous global navigation satellite system data, or any combination thereof.

3. The electronic device of claim 1, wherein the first set of global navigation satellite system resources comprises tracking modernized global navigation satellite system signals and legacy global navigation satellite system signals, and the second set of global navigation satellite system resources comprises tracking the modernized global navigation satellite system signals and not the legacy global navigation satellite system signals.

4. The electronic device of claim 1, wherein the first set of global navigation satellite system resources comprises tracking high elevation signals, medium elevation signals, and low elevation signals, and the second set of global navigation satellite system resources comprises tracking the high elevation signals and the medium elevation signals, and not the low elevation signals.

5. The electronic device of claim 1, wherein the first set of global navigation satellite system resources comprises tracking L1 signals and L5 signals, and the second set of global navigation satellite system resources comprises the L1 signals and not the L5 signals, or the L5 signals and not the L1 signals.

6. The electronic device of claim 1, comprising a receiver, the one or more processors being coupled to the receiver and configured to cause the receiver to receive signal environment data indicating a plurality of geographic areas and whether to operate using the first set of global navigation satellite system resources or the second set of global navigation satellite system resources in each geographic area of the plurality of geographic areas.

7. The electronic device of claim 6, wherein the one or more processors are configured to determine to operate using the first set of global navigation satellite system resources based on the first positional data corresponding to a geographic area of the plurality of geographic areas.

8. The electronic device of claim 6, comprising a transmitter, the one or more processors being coupled to the transmitter and configured to cause the transmitter to transmit an indication that a geographical area associated with the second positional data is to be associated with operating using the second set of global navigation satellite system resources.

9. The electronic device of claim 8, wherein the one or more processors are configured to transmit the indication to a radio access network.

10. The electronic device of claim 9, wherein an operator of the radio access network is configured to update the signal environment data based on the indication.

11. One or more tangible, non-transitory, computer-readable media comprising instructions, that when executed by processing circuitry of user equipment, cause the processing circuitry to:
   receive a first location of the user equipment via a global navigation satellite system receiver of the user equipment based on operating using a first set of global navigation satellite system resources;
   receive first performance values associated with the first set of global navigation satellite system resources;
   receive a second location of the user equipment via the global navigation satellite system receiver based on operating using a second set of global navigation satellite system resources, the second set of global navigation satellite system resources being less than the first set of global navigation satellite system resources;
   receive second performance values associated with the second set of global navigation satellite system resources; and
   continue operating using the second set of global navigation satellite system resources at the second location of the user equipment based on the second performance values being within a threshold range of the first performance values.

12. The one or more tangible, non-transitory, computer-readable media of claim 11, wherein the instructions, when executed by the processing circuitry, cause the processing circuitry to operate using the first set of global navigation satellite system resources at the second location based on the second performance values not being within the threshold range of the first performance values.

13. The one or more tangible, non-transitory, computer-readable media of claim 11, wherein the instructions, when executed by the processing circuitry, cause the processing circuitry to receive signal environment data from a wireless communication network indicating a plurality of geographic areas and whether to operate using the first set of global navigation satellite system resources or the second set of global navigation satellite system resources in each geographic area of the plurality of geographic areas.

14. The one or more tangible, non-transitory, computer-readable media of claim 13, wherein the instructions, when executed by the processing circuitry, cause the processing circuitry to operate using the first set of global navigation satellite system resources based on the first location being within a first geographic area of the plurality of geographic areas.

15. The one or more tangible, non-transitory, computer-readable media of claim 13, wherein the instructions, when executed by the processing circuitry, cause the processing circuitry to transmit, via a transmitter of the user equipment, an indication that a geographical area associated with the second location is to be associated with operating using the second set of global navigation satellite system resources.

16. A method performed by an electronic device comprising:
receiving, via a global navigation satellite system receiver of the electronic device, first positional data associated with the electronic device when operating using a first tracking mode of global navigation satellite system resources;
receiving, at processing circuitry of the electronic device, first performance values associated with the first tracking mode;
receiving, via the global navigation satellite system receiver, second positional data associated with the electronic device via the global navigation satellite system receiver when operating using a second tracking mode of the global navigation satellite system resources, the second tracking mode configured to cause the electronic device to track a fewer number of satellite vehicles than the first tracking mode;
receiving, at the processing circuitry, second performance values associated with the second tracking mode;
continuing, at the processing circuitry, to operate using the second tracking mode based on the second performance values being within a threshold amount of the first performance values; and
switching, at the processing circuitry, to operating using the first tracking mode based on the second performance values not being within the threshold amount of the first performance values.

17. The method of claim 16, wherein the first performance values and the second performance values are associated with a global navigation satellite system signal strength, a ratio of tracked satellite vehicles to available satellite vehicles, a position and velocity accuracy output, a heat map generated based on previous global navigation satellite system data, or any combination thereof.

18. The method of claim 16, comprising receiving, at the processing circuitry, signal environment data indicating a plurality of geofenced areas and whether to operate using the first tracking mode or the second tracking mode in each geofenced area of the plurality of geofenced areas based on a current location of the electronic device.

19. The method of claim 18, comprising, transmitting, via a transmitter of the electronic device, an indication that a location associated with the second positional data is to be associated with operating using the second tracking mode, wherein the signal environment data is configured to be updated based on the indication.

20. The method of claim 16, comprising:
receiving, at the processing circuitry, an indication of signal interference associated with data transmitted or received by the electronic device, and
switching to operating using the first mode of tracking based on the indication.

* * * * *